United States Patent [19]

Ruoff

[11] Patent Number: 4,558,911
[45] Date of Patent: Dec. 17, 1985

[54] ROLLING CONTACT ROBOT JOINT

[75] Inventor: Carl F. Ruoff, La Crescenta, Calif.

[73] Assignee: California Institute of Technology, Pasadena, Calif.

[21] Appl. No.: 564,470

[22] Filed: Dec. 21, 1983

[51] Int. Cl.$^4$ .............................................. H01R 39/02
[52] U.S. Cl. ...................................... 339/5 M; 338/79
[58] Field of Search ............. 339/5 R, 5 A, 5 M, 5 P; 338/73, 79, 97, 142, 157; 414/5

[56] References Cited

U.S. PATENT DOCUMENTS

| Re. 28,672 | 1/1976 | Wakeman | 16/150 |
|---|---|---|---|
| 1,545,843 | 7/1925 | Mulvey . | |
| 2,467,758 | 4/1949 | Lindenblad | 200/155 |
| 2,666,905 | 1/1954 | Gerlach | 336/15 |
| 2,683,202 | 7/1954 | Brown | 201/59 |
| 3,436,841 | 4/1969 | Whitmore et al. | 35/25 |
| 3,501,800 | 3/1970 | O'Dea | 16/150 |
| 3,534,194 | 10/1970 | Speller | 200/166 |
| 3,723,936 | 3/1973 | Zurstadt | 338/40 |
| 3,900,817 | 8/1975 | Punt | 338/157 |
| 3,927,438 | 12/1975 | Blake | 16/150 |
| 4,010,439 | 3/1977 | Lace | 338/125 |
| 4,163,303 | 8/1979 | Hanna | 16/135 |

FOREIGN PATENT DOCUMENTS

| 2101526 | 7/1972 | Fed. Rep. of Germany . | |
| 2930388 | 1/1981 | Fed. Rep. of Germany | 338/157 |
| 819411 | 3/1937 | France . | |
| 1030268 | 12/1950 | France . | |
| 516852 | 1/1940 | United Kingdom | 338/79 |
| 219674 | 5/1981 | U.S.S.R. . | |
| 834783 | 6/1981 | U.S.S.R. | 338/79 |

Primary Examiner—Eugene F. Desmond
Attorney, Agent, or Firm—Jackson & Jones

[57] ABSTRACT

A robot joint comprising first and second link members having respective congruent arcuate surfaces joined by complementary flexible metal bands and having an integral potentiometer transducer mechanism.

7 Claims, 9 Drawing Figures

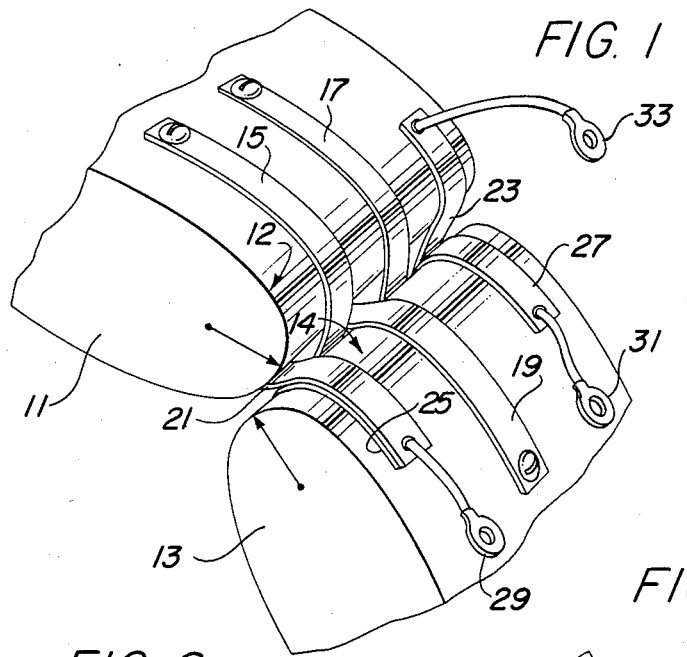
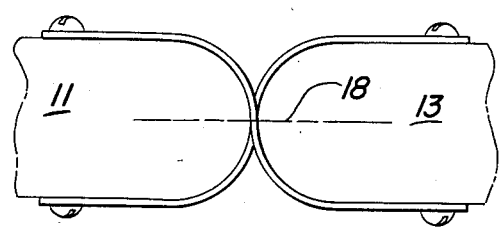
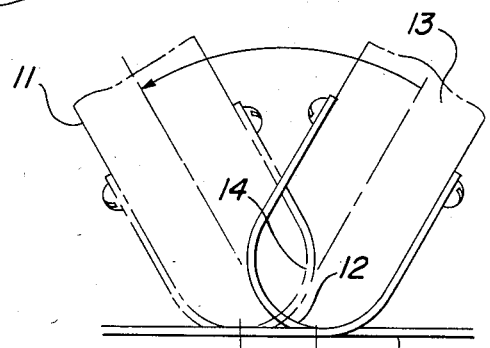
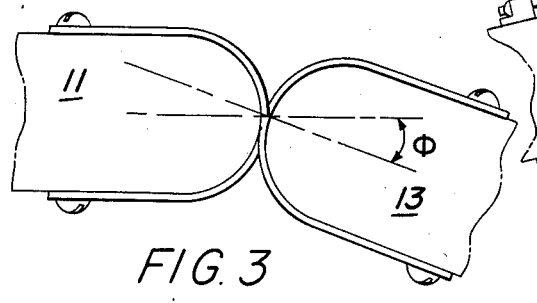
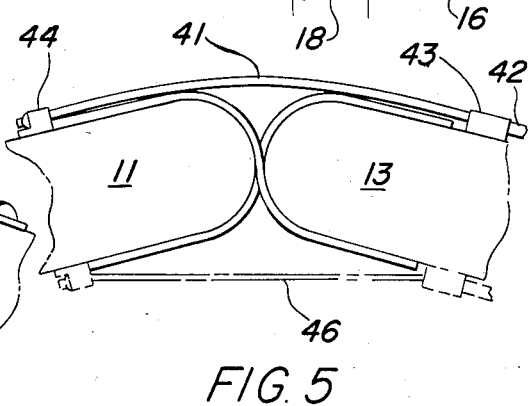

ROLLING CONTACT ROBOT JOINT

BACKGROUND OF THE INVENTION

1. Field of the Invention

The subject invention relates to mechanical joints, and more particularly to a robot joint exhibiting superior frictional and positional feedback performance. Such a joint is particularly needed in forming robot finger joints.

2. Background of the Invention

In the prior art, robot joints are known which are linked together by the conventional journal-bearing method, which involves considerable friction loss. Positional feedback used to control movement of such joints is typically provided by conventional wiping contact potentiometers. Such potentiometers generate noise on the signal output because of contact bounce, stick-slip action, galling and the like. Such noise can detract from the high precision required for proper servomechanism feedback operation.

SUMMARY OF THE INVENTION

It is therefore an object of the invention to provide an improved mechanical joint.

It is a further object of the invention to provide a robot joint which provides both improved frictional and servo feedback performance.

It is yet another object of the invention to provide an improved potentiometer mechanism adaptable to the miniaturization requirements of robot joints, while at the same time providing improvements in electrical performance over prior art potentiometer mechanisms.

It is yet another object of the invention to provide an improved robot joint having a servo feedback potentiometer providing high precision and low driving torques.

These and other objects of the invention are achieved by connecting two link members having contiguous curved surfaces with flexible bands such that the contiguous curved surfaces essentially roll about one another. To add transducer capability, a flexible conductor is attached on one adjacent curved surface such that, as the links move with respect to one another, the flexible conductor may roll up onto or roll off of the curved link surface, thereby varying the amount of contact with a second conductor mounted on the adjacent curved surface of the other link. Varying resistance is thus generated as the link members move with respect to one another. The invention provides both low friction operation and a servo feedback signal in environments where conventional miniature potentiometers are cumbersome—and, in the case of closely spaced robot fingers, even impossible to use.

BRIEF DESCRIPTION OF THE DRAWINGS

The preferred embodiment for the just-summarized invention will now be described in detail in conjunction with the drawings of which:

FIG. 1 illustrates a robot joint according to the preferred embodiment.

FIGS. 2–4 illustrate the link attachment mechanism of the preferred embodiment.

FIG. 5 is an illustration of a mechanism for imparting motion to the links of FIG. 1.

DETAILED DESCRIPTION OF THE PREFERRED EMBODIMENTS

Figure 6:
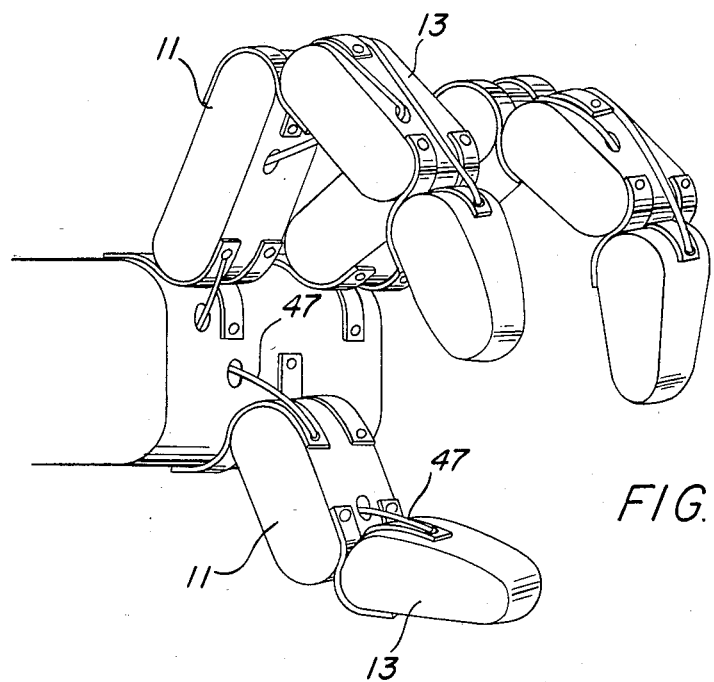
FIG. 6 is a pictorial view of a robot hand configured with linkages according to the invention.

FIG. 1 illustrates an improved robot joint made up of first and second links 11, 13 and flexible metal bands 15, 17, 19. Two of the bands 15, 17 form a band pair which is attached to the top side of the first link 11 and the underside of the second link 13. The other band 19 attaches to the top side of the second link 13 and the underside of the first link 11. The bands 15, 17, 19 are secured such that the two links 11, 13 touch at arcuate surfaces 12, 14 and may move by rolling about each other. (The links are shown slightly displaced from one another in FIG. 1 for illustrative purposes.)

The first link 11 of FIG. 1 also has two thin flexible ribbon conductors 21, 23 attached thereto. The second link 13 has resistive areas 25, 27 affixed thereto. The conductors 21, 23 roll onto and unroll from the curved surface of the second link 13, depending on the direction of relative rotation of the links 11, 13. This rolling action will be illustrated in more detail in connection with discussion of FIGS. 7–9 below. Rotation of the links 11, 13 with respect to one another results in a varying degree of surface contact between the ribbon conductors 21, 23 and resistive areas 25, 27, thus producing a varying resistance, e.g., between terminals 31 and 33. The particular embodiment of FIG. 1 provides for an increase in resistance of one conductor/resistor pair, e.g., 23, 27, and decrease in the other, e.g., 21, 25, thus permitting connection in a bridge configuration to reduce temperature sensitivity.

The foregoing discussion with respect to FIG. 1 illustrates one embodiment of the invention. Further description of the operation and application of the invention will now be presented, addressing first the link attachment features and then the servo-transducer aspects of the invention.

Considering further the operation of the linkage of FIG. 1, it may be observed that the two links 11, 13 are constrained to be held together and can only have a relative rotational motion between them. As shown in FIGS. 2 and 3, this rotational motion is actually executed by a rolling motion of one link upon the other. FIG. 2 illustrates the line of contact 18 between the two links 11, 13. In FIG. 3, the second link 13 has rolled around the end of the first link 11 such that the line of contact 18 has moved by an angle $\phi$.

If the bands 15, 17, 19 and the links 11, 13 are fabricated of hard materials which do not deform greatly under load there will be very little contact friction. An element which suggests itself for usage is the Sandia Rolamite element, which has the lowest friction of any contacting mechanical element. Using Rolamite, the major source of friction is the internal molecular friction due to bending of the bands 15, 17, 19.

As shown in FIG. 4, the two congruent surfaces 12, 14 need not be circular arcs as illustrated in FIG. 1; as one band is paid out the other is taken up an equal amount. As the link rotates by rolling on its base 16, the line of contact 18 moves along the base 16 by a distance equal to that rolled out along the arcuate surface of the end of the link; this arc distance is the same for each band and so there is no mismatch in the positions of the bands with respect to the base—even if the link is not symmetrical.

FIG. 5 illustrates a straightforward means of imparting motion by means of a sheathed cable 41. The sheath 42 is anchored to one link 13 by a sheath anchor 43, and the internal cable 41 is anchored to the other link 11 by an anchor 44. If the cable 41 is actually a stiff wire that can act in a push-pull fashion, then the sheathed wire 41 will serve in some applications to impart both flexing and extending motions. However, in many precision applications, the wire's bend, when pushing, will result in an imprecise motion—especially under load. In this case, a pair of cables 41, 46, operating in pull-pull (in alternation) mode will impart a more precise motion. The second cable 46 must be located on the opposite side of the links, as indicated by the dashed lines in FIG. 5.

The latter approach suffers from at least two disadvantages: (1) the varying friction caused by the sliding of the cables 41, 46 against the links or bands (present in the top cable 41 but momentarily absent in the lower cable 46 of FIG. 5), and (2) the proliferation of cables—two per link. In a three-link robotic finger, the cable-pair-per-link system would require six cables per finger; whereas the same job could be done with only four cables. A four-cable system requires the mounting of relaying sheaves at each link's (virtual) axis of rotation, around which the cables are passed. While this approach offers a more constant frictional load on the cables (since they never contact anything but their sheaves), it does require care in geometric design. The lengths between successive relaying sheaves must not change as the links rotate, or precise position control and feedback will be lost.

Referring again to FIG. 1, there is a tendency of the bands 15, 17, 19 to be straight between the links 11, 13; such that the links 11, 13 are not in actual contact, unless otherwise preloaded towards each other. This preload can be in the form of elastic tension between links 11, 13. However, in schemes using pull-pull cable arrangements, the tension of the cables will provide adequate preload. FIG. 1 illustrates bands 15, 17, 19 mounted on the surface of link members 11, 13. Alternatively, the bands 15, 17, 19 may be set into grooves in the surfaces of the links 11, 13.

FIG. 6 illustrates how a number of links 11, 13 such as those in FIG. 1 may be associated to constitute a robot hand. Control rods 47 for positioning the links are also illustrated.

Various embodiments of servo-transducers similar to that disclosed in FIG. 1 may prove useful in differing applications. Such variations are discussed hereafter with respect to FIGS. 7, 8 and 9. Various other applications will be apparent to those skilled in the art.

Figure 7:
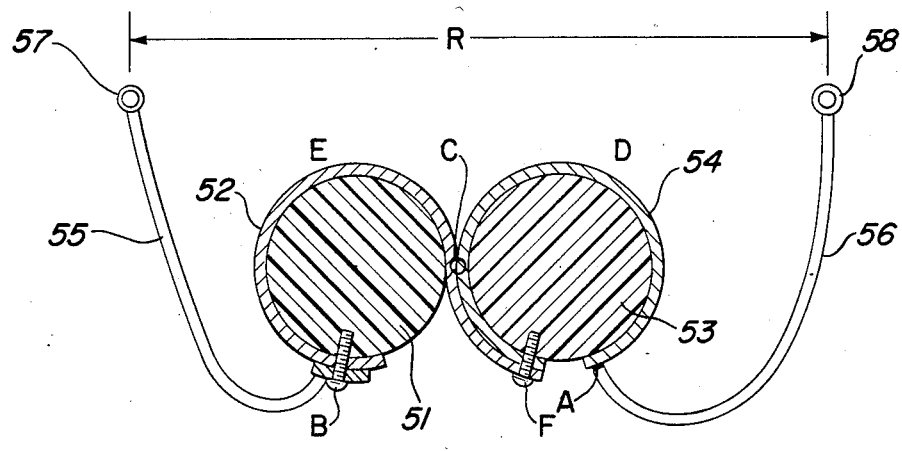
FIGS. 7–9 illustrate alternative embodiments of potentiometers applicable to a link arrangement such as that of FIG. 1.

FIG. 7 illustrates an insulating roller 51, a thin flexible ribbon conductor 52 of resistance material attached to the first roller 51 at point B and rolled onto its surface, a second insulating roller 53 with resistance material 54 deposited over a sector of its surface, and two flexible conductors 55, 56 communicating with terminals 57, 58. The resistance elements 52, 54 are connected at a point F.

The roller/resistance elements 51, 52, 53, 54 are constrained to roll and remain in contact, for example, by bearings not shown. The resistance ribbon 52 may unroll from the insulating roller 51 as it rolls onto the cylindrical surface of the resistance material 54 on the roller 53, or it may unroll from the cylindrical surface of the resistance material 54 onto the insulating roller 51. If the resistance material has resistance p per unit length, then the total resistance R between terminals 57 and 58, assuming low resistance for the flexible conductors 55, 56 is:

$$R = pr(\theta_1 + \theta_2)$$

where r is the common radius of the insulating rollers 51, 53 and $\theta_1$, $\theta_2$ (measured in radians) are the angles CEB and CDA respectively.

If, now, the first roller 51 is rotated counterclockwise, ribbon material will be unrolled from the second roller 53, causing it to rotate clockwise. Since point C, the point of contact, is fixed in space by the aforementioned bearings, the net effect is to increase the angles CEB and CDA, thereby increasing the resistance between the two terminals 57, 58. If, on the other hand, the total resistance between the terminals 57, 58 would decrease because angles CEB and CDA would decrease.

Figure 8:
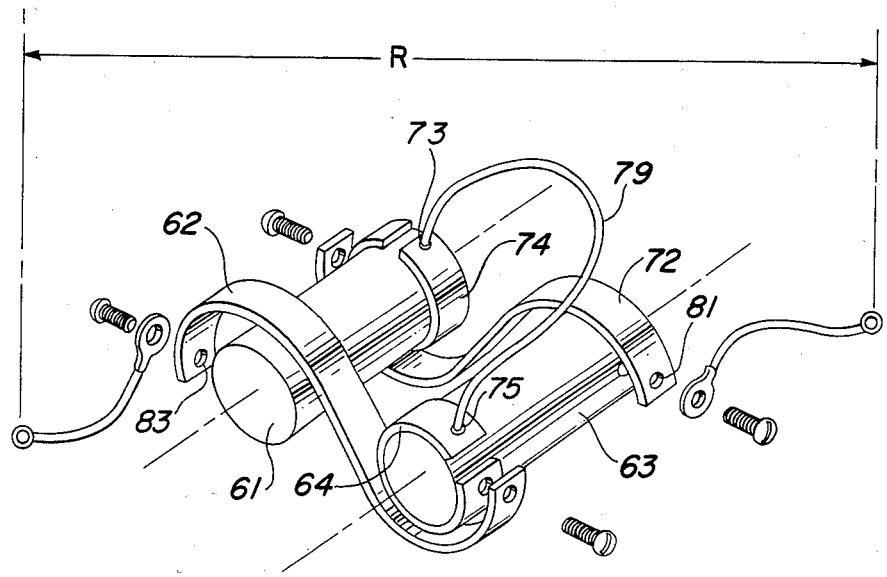

The alternative design of FIG. 8 uses two flexible ribbons 62, 72 arranged so that both clockwise and counterclockwise motion of a first roller 61 would be communicated to a second roller 63 by ribbon tension. In this case, the second ribbon 72 can also serve as a resistance element if the rear portion of the first roller 61 is equipped with a sectoral resistance 74. If points 73 and 75 in FIG. 8 are connected electrically by a cable 79, then the resistance between points 83 and 85 will be the series resistance of the two ribbon systems. This resistance will increase when the first roller 61 is rotated counterclockwise, and decrease upon clockwise rotation, thus forming a rheostat. The elements 62, 72, 64, 74 can also clearly be connected in parallel.

Figure 9:
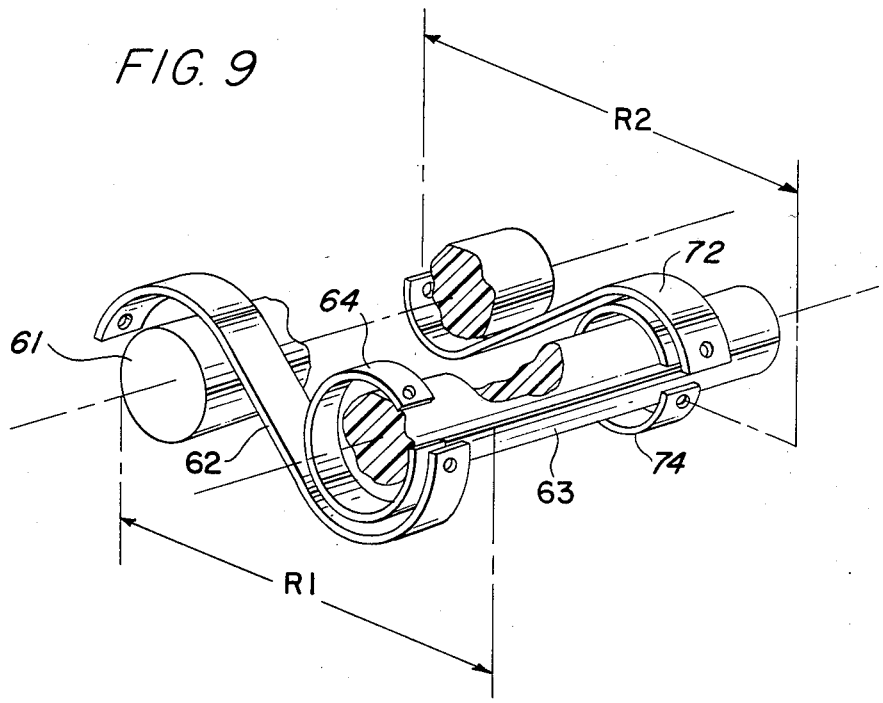

If the resistance elements 64, 74 are arranged on the rollers 61, 63 as shown in FIG. 9, turning the rollers 61, 63 to cause an increase in resistance R1 will result in a corresponding decrease in resistance R2 and vice-versa. Thus, the resistances can be connected in a bridge configuration for temperature insensitivity, as in the embodiment of FIG. 1.

As is apparent from the foregoing discussion, numerous modifications and adaptations of the preferred embodiment may be made without departing from the scope and spirit of the invention. Therefore it is to be understood that, within the scope of the appended claims, the invention may be practiced other than as specifically described herein.

What is claimed is:

1. An electromechanical robotic joint member comprising:
   first and second separate link members for the robotic joint, with said members having respective oppositely disposed joint surfaces adjacent to and facing one another with at least one of said joint surfaces being curved;
   a plurality of flexible and electrically-conductive bands for structurally joining the separate link members into an articulate joint and for varying an electrical resistance as said link members, so joined, are articulated in rolling contact with respect to one another, said plurality of bands characterized by:
   first band means mounted on the upper surface of said first link member and the under surface of said link member;
   second band means mounted on the upper surface of said second link member and on the under surface of said first link;

a first conductive surface mounted on one of said first and second link members, said first conductive surface exhibiting a selected impedance characteristic and having a first terminal contact point; and a second flexible conductive surface having a second terminal point and also mounted on one of said first and second link members and held by said first and second band means in rolling contact with said first conductive surface and positioned to wrap onto and unwrap therefrom, said second flexible conductive surface being positioned to roll on and off said first conductive surface such that relative movement between said first and second link members produces a variation in the impedance between said terminal contact points.

2. The joint of claim 1 wherein said oppositely disposed surfaces are both curved.

3. The joint of claim 1 wherein said oppositely disposed surfaces are circular arcs.

4. The joint of claims 1, 2 or 3 wherein said first band means comprises a first band member and a second band member and wherein said second band means comprises a third band member disposed between said first and second band members.

5. The joint of claim 1 wherein said first band means comprises a first band member and a second band member, wherein said second band means comprises a third band member disposed between said first and second band members, and wherein said first, second and third band members each comprise flexible metallic strips.

6. The joint of claim 1 wherein said first conductive surface comprises a resistive layer.

7. The joint of claim 6 wherein said second conductive surface comprises a flexible ribbon conductor.

* * * * *

UNITED STATES PATENT AND TRADEMARK OFFICE
CERTIFICATE OF CORRECTION

PATENT NO. : 4,558,911
DATED : Dec. 17, 1985
INVENTOR(S) : Carl F. Ruoff

It is certified that error appears in the above—identified patent and that said Letters Patent is hereby corrected as shown below:

In Col. 4, line 17, after "hand," should be --- the second roller 53 were rotated counter-clockwise, ---.

Signed and Sealed this

Eighth Day of July 1986

[SEAL]

Attest:

DONALD J. QUIGG

Attesting Officer

Commissioner of Patents and Trademarks